United States Patent
Yutani et al.

(10) Patent No.: US 10,193,793 B2
(45) Date of Patent: Jan. 29, 2019

(54) BROWSER APPARATUS, RECORDING MEDIUM, SERVER APPARATUS, AND INFORMATION PROCESSING METHOD

(71) Applicant: SONY CORPORATION, Tokyo (JP)

(72) Inventors: Tetsuo Yutani, Kanagawa (JP); Takashi Togame, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 118 days.

(21) Appl. No.: 15/025,453

(22) PCT Filed: Nov. 21, 2014

(86) PCT No.: PCT/JP2014/080867
§ 371 (c)(1),
(2) Date: Mar. 28, 2016

(87) PCT Pub. No.: WO2015/083563
PCT Pub. Date: Jun. 11, 2015

(65) Prior Publication Data
US 2016/0212037 A1 Jul. 21, 2016

(30) Foreign Application Priority Data
Dec. 4, 2013 (JP) .................................. 2013-251510

(51) Int. Cl.
*H04L 12/28* (2006.01)
*H04L 12/56* (2006.01)
(Continued)

(52) U.S. Cl.
CPC ............ *H04L 45/16* (2013.01); *G06F 3/0482* (2013.01); *G06F 17/30861* (2013.01);
(Continued)

(58) Field of Classification Search
CPC ..... H04L 45/16; H04L 12/1863; H04L 67/02; H04W 4/06; G06F 3/0482; G06F 17/30887; G06F 17/30861
(Continued)

(56) References Cited

U.S. PATENT DOCUMENTS 6,351,467 B1    2/2002  Dillon
6,442,598 B1    8/2002  Wright et al.
(Continued)

FOREIGN PATENT DOCUMENTS

JP    2001 522171    11/2001
JP    2008 276924    11/2008
(Continued)

OTHER PUBLICATIONS

International Search Report dated Feb. 17, 2015, in PCT/JP2014/080867 Filed Nov. 21, 2014.

*Primary Examiner* — Chuong T Ho
(74) *Attorney, Agent, or Firm* — Xsensus LLP

(57) ABSTRACT

The present technology relates to a browser apparatus, a recording medium, a server apparatus, and an information processing method by which a load in viewing web content can be reduced.
Provided is a browser apparatus that implements a web browser including a unicast communication function section that sends a request to a web site and receives web content from the web site using a unicast protocol, and a multicast communication function section that receives web content multicast-distributed using a multicast protocol. The browser apparatus includes a control unit that controls, in response to an external input, the unicast communication function section of the web browser to send a request to a web site and receive web content from the web site using the unicast protocol.

5 Claims, 11 Drawing Sheets

(51) Int. Cl.
*H04L 12/761* (2013.01)
*G06F 17/30* (2006.01)
*G06F 3/0482* (2013.01)
*H04W 4/06* (2009.01)
*H04L 12/18* (2006.01)
*H04L 29/08* (2006.01)

(52) U.S. Cl.
CPC .... *G06F 17/30887* (2013.01); *H04L 12/1863* (2013.01); *H04W 4/06* (2013.01); *H04L 67/02* (2013.01)

(58) Field of Classification Search
USPC ............ 370/390; 709/218, 219, 217; 725/40
See application file for complete search history.

(56) References Cited

U.S. PATENT DOCUMENTS

| | | |
|---|---|---|
| 2002/0061021 A1 | 5/2002 | Dillon |
| 2002/0061029 A1 | 5/2002 | Dillon |
| 2003/0206554 A1 | 11/2003 | Dillon |
| 2007/0260965 A1* | 11/2007 | Schmidt ................ H04L 1/0045 714/799 |
| 2008/0098444 A1* | 4/2008 | Shikata .............. H04N 7/17318 725/110 |
| 2008/0177822 A1* | 7/2008 | Yoneda ................ H04L 12/282 709/202 |
| 2011/0302320 A1* | 12/2011 | Dunstan ............ G06F 17/30017 709/235 |
| 2012/0198020 A1* | 8/2012 | Parker .................. H04W 12/08 709/217 |
| 2012/0239785 A1* | 9/2012 | Pazos .................. H04L 12/1881 709/219 |
| 2012/0254918 A1* | 10/2012 | Takahashi .......... H04N 21/4331 725/40 |
| 2013/0302005 A1* | 11/2013 | Harwell ............. H04N 21/2408 386/200 |

FOREIGN PATENT DOCUMENTS

JP           2010 35088        2/2010
WO      WO 2013/068415 A1     5/2013

* cited by examiner

BROWSER APPARATUS, RECORDING MEDIUM, SERVER APPARATUS, AND INFORMATION PROCESSING METHOD

TECHNICAL FIELD

The present technology relates to a browser apparatus, a recording medium, a server apparatus, and an information processing method and in particular to a browser apparatus, a recording medium, a server apparatus, and an information processing method by which a load in viewing web content can be reduced.

BACKGROUND ART

In the fields of communications, unicast communication is widely used. In the unicast communication, a single transmission target is specified and data is transmitted thereto. Specifically, for viewing a web site using a web browser at a client apparatus (browser apparatus), a request from the web browser is sent to a web server apparatus and the web server apparatus distributes the web content as a response.

Furthermore, the present applicant has proposed a technology of using audio data of a music track and repeatedly broadcasting it in a predetermined unit time (e.g., see Patent Document 1).

Patent Document 1: Japanese Patent Application Laid-open No. 2008-276924

SUMMARY OF INVENTION

Problem to be Solved by the Invention

By the way, in the conventional communication technology, the unicast communication is widely used unlike the above-mentioned technology using a broadcast. Therefore, even clearly identical web content items are distributed to respective users who have requested it as long as it is within a certain period.

For example, regarding web content that many users view in approximately the same time zone, for example, news or a weather forecast, request of the web content and distribution as a response thereof are performed in a short time. Thus, loads on a network and the web server apparatus temporarily significantly increases.

Therefore, there is a fear that troubles may occur in equipment assuming average loads. For avoiding such troubles, it is necessary to provide equipment assuming load peaks in advance. However, providing such equipment increases the costs.

The present technology has been made in view of such situations to be capable of reducing a load in viewing web content.

Means for Solving the Problem

A browser apparatus according to a first aspect of the present technology implements a web browser application including a first communication function section that sends a request to a web site and receives web content from the web site using a unicast protocol, and a second communication function section that receives web content multicast-distributed using a multicast protocol. The browser apparatus includes a control unit that controls, in response to an external input, the first communication function section of the web browser application to send a request to a web site and receive web content from the web site using the unicast protocol.

The second communication function section may receive a plurality of web content items, and the control unit may record only a web content item of the plurality of web content items, which has a particular URL address, on a recording medium.

The control unit may control, if the web content received by the second communication function section has an error, the first communication function section to request the web content from the web site.

The browser apparatus may further include a communication interface capable of accessing a mobile communication network. The first communication function section and the second communication function section may perform communication via the communication interface.

A recording medium according to the first aspect of the present technology is a recording medium corresponding to the above-mentioned browser apparatus according to the first aspect of the present technology.

In the browser apparatus and the recording medium according to the first aspect of the present technology, by the web browser application, a request is sent to a web site and web content is received from the web site using a unicast protocol, and web content multicast-distributed is received using a multicast protocol. In addition, in response to an external input, the web browser application is controlled to send a request to a web site and receive web content from the web site using a unicast protocol.

A server apparatus according to a second aspect of the present technology includes: a first communication function section that receives web content from a web site using a unicast protocol; a cash memory that temporarily stores the web content; a second communication function section that multicast-distributes the temporarily stored web content using a multicast protocol; and a control unit that controls operations of the first communication function section, the second communication function section, and the cash memory.

The control unit may add header information including at least an update time of the web content to the temporarily stored web content and package the web content, to thereby generate a content pack, and the second communication function section may multicast-distribute the content pack.

The control unit may further add a check sum for error correction to the web content and package the web content.

The control unit may generate a list of URL addresses of web sites of a plurality of content packs, and the second communication function section may multicast-distribute the list of the URL addresses at predetermined intervals.

An information processing method according to a second aspect of the present technology is an information processing method corresponding to the above-mentioned server apparatus according to the second aspect of the present technology.

In the server apparatus and the information processing method according to the second aspect of the present technology, An information processing method for a server apparatus, reception of web content from a web site using a unicast protocol is controlled, temporary storage of the web content in a cash memory is controlled, and multicast distribution of the web content temporarily stored in the cash memory using a multicast protocol is controlled.

The browser apparatus and the server apparatus may be independent apparatuses or may be internal blocks that constitute a single apparatus.

Effects of the Invention

According to the first aspect and the second aspect of the present technology, it is possible to reduce a load in viewing web content.

Note that the effects described here are not necessarily limited and may be any effects described in the present disclosure.

MODE(S) FOR CARRYING OUT THE INVENTION

Hereinafter, embodiments according to the present technology will be described with reference to the drawings.

Note that the descriptions will be made in the following order.
1. System Configuration
2. Protocol Stack
3. Distribution Method for Web Content
4. Specific Processing Flows of apparatuses
5. Modified Example
6. Configuration of Computer
   <1. System Configuration>
   (Configuration of Communication System)

Figure 1:
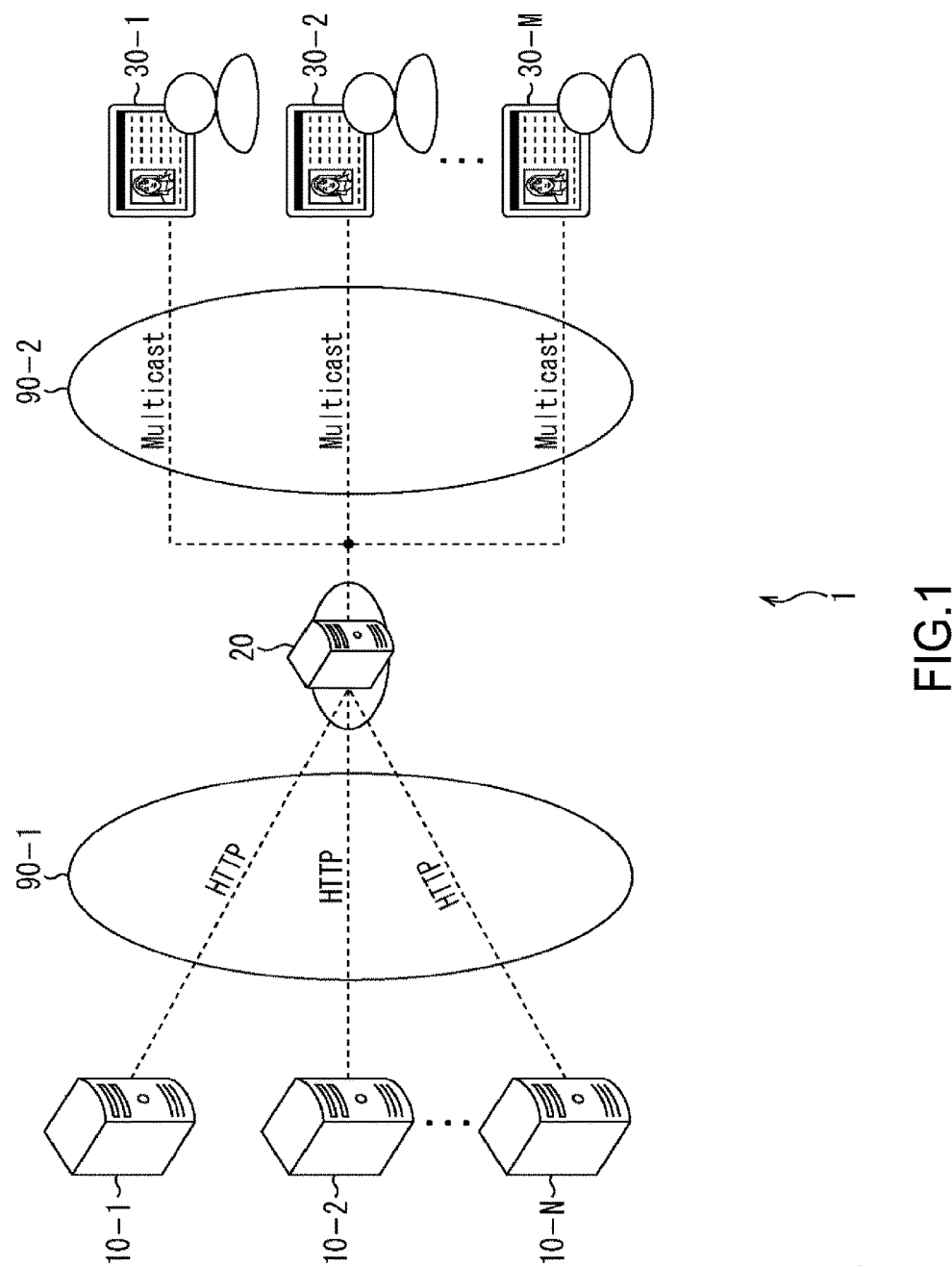
FIG. 1 A diagram showing an embodiment of a communication system to which the present technology is applied.

FIG. 1 is a diagram showing an embodiment of a communication system to which the present technology is applied.

As shown in FIG. 1, a communication system 1 is constituted of web server apparatuses 10-1 to 10-N (N is integer equal to or larger than 1), an intermediate server apparatus 20, and browser apparatuses 30-1 to 30-M (M is integer equal to or larger than 1). The intermediate server apparatus 20 and the web server apparatuses 10-1 to 10-N are mutually connected via a network 90-1. Furthermore, the intermediate server apparatus 20 and the browser apparatuses 30-1 to 30-M are mutually connected via a network 90-2.

The web server apparatus 10-1 is a dedicated server (origin server) that provides a web site. The web server apparatus 10-1 provides web content disclosed on the web site to the intermediate server apparatus 20 via the network 90-1.

Note that information that is not user specific information such as a search result of a search engine, information whose content is different between users, for example, news and a weather forecast, and further whose content is not dynamically changed are suitable as the web content. Furthermore, the web content is constituted of a plurality of files such as HyperText Markup Language (HTML) documents, cascading style sheets (CSS), JavaScript (registered trademark), and image data. In the following description, those files will be also collectively referred to as a resource.

The web server apparatuses 10-2 to 10-N provide web content of web sites to the intermediate server apparatus 20 via the network 90-1 as in the web server apparatus 10-1. It should be noted that unicast communication according to HTTP (HyperText Transfer Protocol) is performed in the web server apparatuses 10-1 to 10-N and the intermediate server apparatus 20.

The intermediate server apparatus 20 acquires, from the web server apparatuses 10-1 to 10-N, the web content via the network 90-1 and temporarily stores it. The intermediate server apparatus 20 multicast-distributes the temporarily stored web content to the browser apparatuses 30-1 to 30-M via the network 90-2.

Note that, when the intermediate server apparatus 20 performs multicast distribution of the web content, the browser apparatuses 30-1 to 30-M participate in a multicast group in advance. The multicast group is one obtained by grouping a plurality of terminal apparatuses that receive the web content multicast-distributed from the intermediate server apparatus 20. For example, the multicast group is managed by relay apparatuses such as router apparatuses (not shown) provided in communication paths of the intermediate server apparatus 20 and the browser apparatuses 30-1 to 30-M, using a routing table or the like.

The browser apparatus 30-1 receives the web content multicast-distributed from the intermediate server apparatus 20 via the network 90-2. In the browser apparatus 30-1, the web content from the intermediate server apparatus 20 is displayed on the display unit by the web browser.

As in the browser apparatus 30-1, the browser apparatuses 30-2 to 30-M receive the web content multicast-distributed from the intermediate server apparatus 20 and display it on the display unit by the web browser. Note that the browser apparatuses 30-1 to 30-M are electronic apparatuses, for example, a tablet terminal, a smart phone, a mobile phone, an eyeglass-type or wristwatch-type wearable computer, a notebook-type personal computer, and a personal computer.

Although the network 90-1 and the network 90-2 are, for the sake of description, described as different networks in FIG. 1, they may be configured as the same network, for example, the Internet. Furthermore, if the browser apparatuses 30-1 to 30-M are mobile communication terminals such as a tablet terminal, a smart phone, and a mobile phone, for example, the network 90-2 includes a mobile communication network such as a mobile phone communication network and the mobile communication terminal is connected to an Internet network via the mobile communication network.

In the following description, if it is not particularly necessary to distinguish the web server apparatuses 10-1 to 10-N from one another, they will be referred to as web server apparatuses 10, and if it is not particularly necessary to distinguish the browser apparatuses 30-1 to 30-M from one another, they will be referred to as browser apparatuses 30. In addition, if it is not particularly necessary to distinguish the network 90-1 and the network 90-2 from each other, they will be referred to as networks 90.

(Configuration of Intermediate Server Apparatus)

Figure 2:
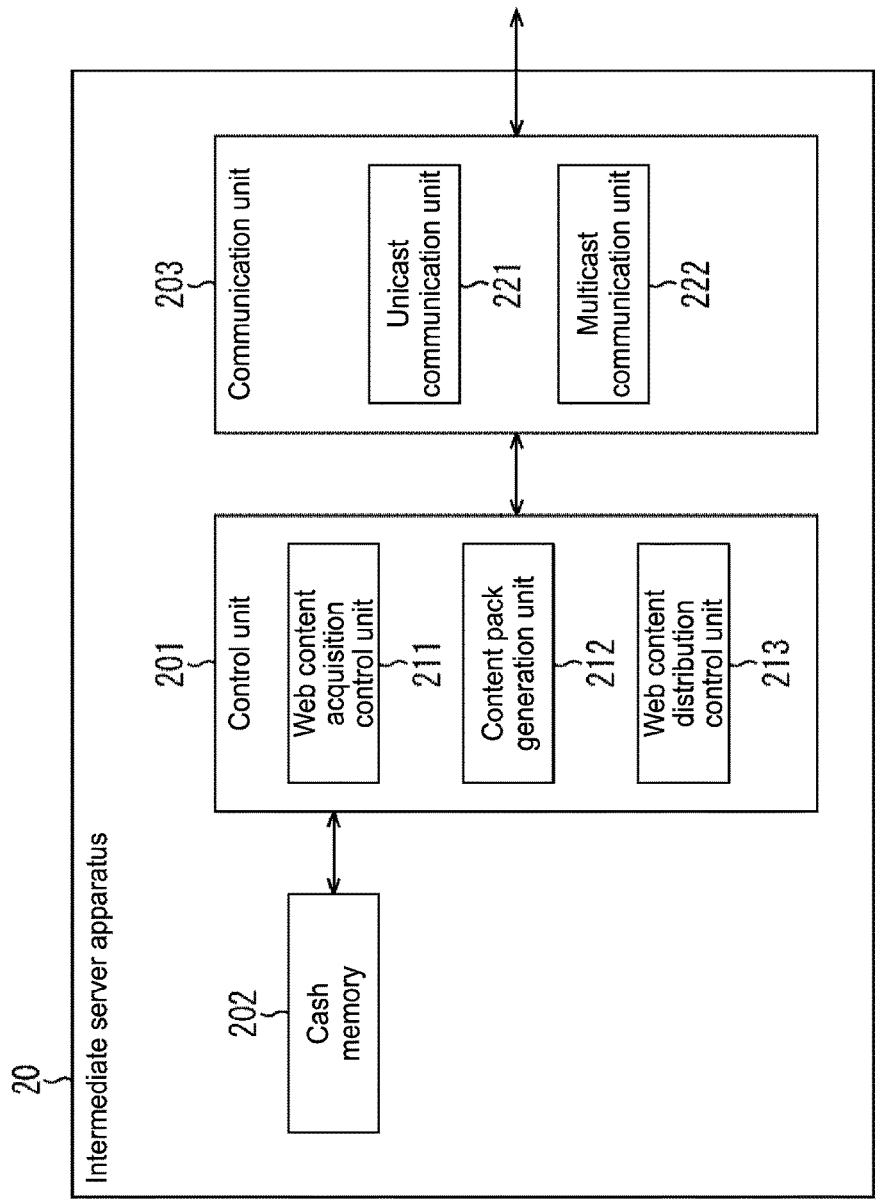
FIG. 2 A diagram showing an embodiment of a server apparatus to which the present technology is applied.

FIG. 2 is a diagram showing an embodiment of the server apparatus to which the present technology is applied.

As shown in FIG. 2, the intermediate server apparatus 20 is constituted of a control unit 201, a cash memory 202, and a communication unit 203.

The control unit 201 controls operations of the respective sections of the intermediate server apparatus 20. The cash memory 202 temporarily stores various types of data under the control of the control unit 201.

Under the control of the control unit 201, the communication unit 203 exchanges various types of data with respect to the web server apparatus 10 or the browser apparatus 30 via the network 90.

Furthermore, the control unit 201 is constituted of a web content acquisition control unit 211, a content pack generation unit 212, and a web content distribution control unit 213.

The web content acquisition control unit 211 controls the communication unit 203 and acquires the web content from the web server apparatuses 10-1 to 10-N via the network 90-1. The web content acquisition control unit 211 temporarily stores the web content acquired from the web server apparatuses 10-1 to 10-N in the cash memory 202.

The content pack generation unit 212 reads out the web content temporarily stored in the cash memory 202 and packages it, to thereby generate a content pack. The content pack generation unit 212 supplies the generated content pack to the web content distribution control unit 213. Note that the details of the content pack will be described later with reference to FIGS. 5 and 6.

The web content distribution control unit 213 controls the communication unit 203 and multicast-distributes the content pack supplied from the content pack generation unit 212, to the browser apparatuses 30-1 to 30-M that participate in the multicast group via the network 90-2.

Furthermore, the communication unit 203 is constituted of a unicast communication unit 221 and a multicast communication unit 222. The unicast communication unit 221 has a function relating to the unicast communication out of the communication functions of the communication unit 203. Furthermore, the multicast communication unit 222 has a function relating to the multicast communication out of the communication functions of the communication unit 203.

In the thus configured intermediate server apparatus 20, the web content from the web server apparatuses 10-1 to 10-N is received and cashed, and then multicast-distributed to the browser apparatuses 30-1 to 30-M as the content pack. Note that, in the network 90, the intermediate server apparatus 20 is arranged closer to the browser apparatus 30 in comparison with the web server apparatus 10, and hence it can be said that it is a so-called edge server apparatus.

(Configuration of Browser Apparatus)

Figure 3:
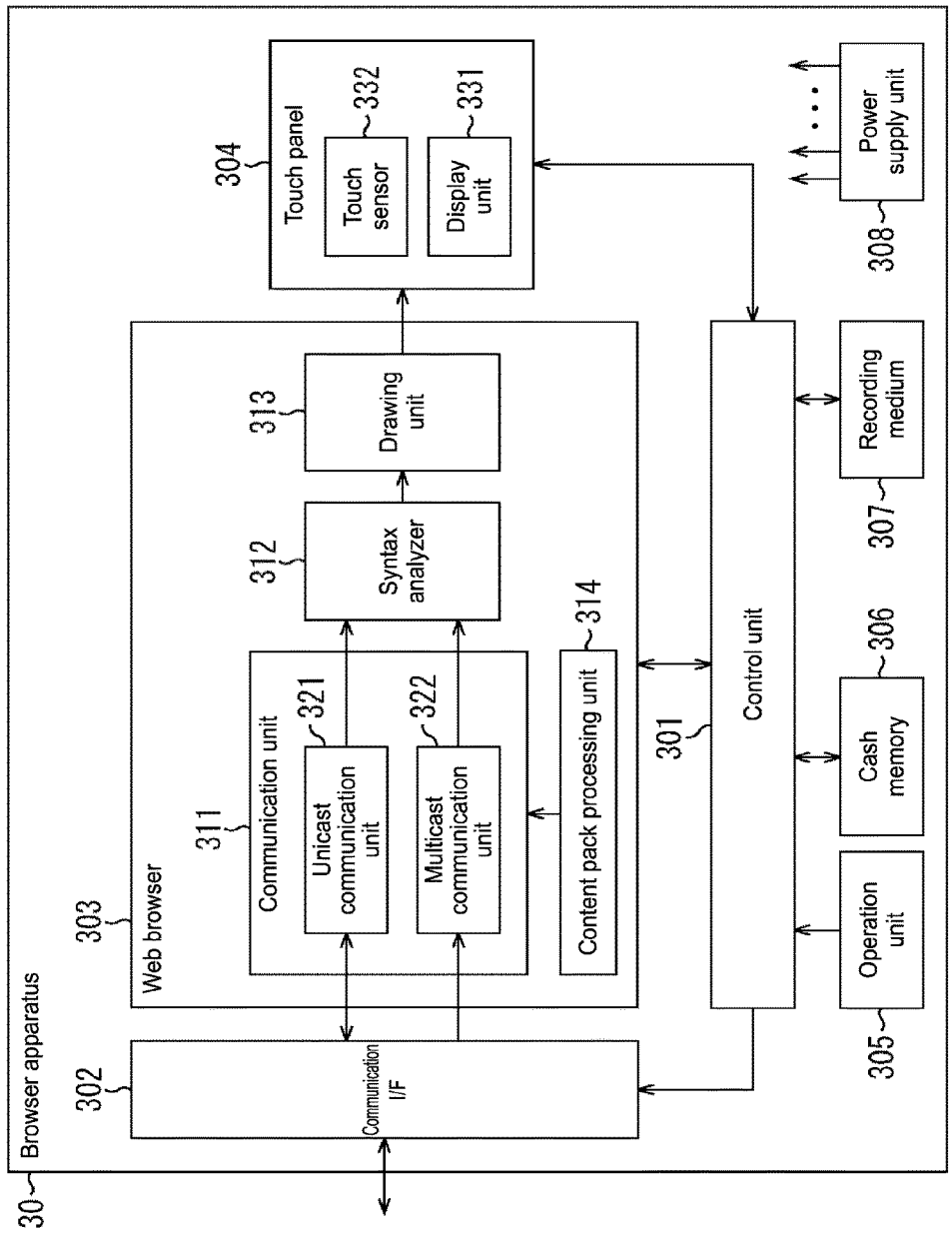
FIG. 3 A diagram showing an embodiment of a browser apparatus to which the present technology is applied.

FIG. 3 is a diagram showing an embodiment of a browser apparatus to which the present technology is applied.

As shown in FIG. 3, the browser apparatus 30 is constituted of a control unit 301, a communication I/F 302, a web browser 303, a touch panel 304, an operation unit 305, a cash memory 306, a recording medium 307, and a power supply unit 308.

The control unit 301 controls operations of the respective sections of the browser apparatus 30.

The communication I/F 302 is a communication interface capable of accessing the network 90 including the mobile communication network and the like.

The web browser 303 is a web browser application for viewing the web content and displays, under the control of the control unit 301, the web content on the display unit 331 of the touch panel 304. The web browser 303 is constituted of a communication unit 311, a syntax analyzer 312, a drawing unit 313, and a content pack processing unit 314.

The communication unit 311 controls, under the control of the control unit 301, the communication I/F 302 and exchanges various types of data with respect to the intermediate server apparatus 20 and other server apparatuses (not shown) via the network 90. The communication unit 311 is constituted of a unicast communication unit 321 and a multicast communication unit 322.

The unicast communication unit 321 has a function relating to the unicast communication out of the communication functions of the communication unit 311. For example, the unicast communication unit 321 sends a request to the server apparatus (not shown) that provides a web site, via the communication I/F 302, receives the web content from the web site, and supplies it to the syntax analyzer 312.

Furthermore, the multicast communication unit 322 has a function relating to the multicast communication out of the communication functions of the communication unit 311. For example, the multicast communication unit 322 receives the web content multicast-distributed from the intermediate server apparatus 20, via the communication I/F 302, and supplies it to the syntax analyzer 312.

The syntax analyzer 312 is supplied with the web content from the unicast communication unit 321 or the multicast communication unit 322. The syntax analyzer 312 analyzes the web content and arithmetically determines the positions and the like of characters, images, or the like drawn on the screen of the display unit 331 of the touch panel 304. The syntax analyzer 312 supplies the result of analysis to the drawing unit 313.

The drawing unit 313 displays, based on an analysis result supplied from the syntax analyzer 312, the web content on the screen of the display unit 331 of the touch panel 304. For example, on the display unit 331, information such as news, a weather forecast, and an advertisement that are formed of text, image, and the like is displayed in a display region thereof together with a user interface (UI) of the web browser 303.

The content pack processing unit 314 performs processing related to the content pack that includes error correction processing of the content pack, under the control of the control unit 301. Note that the details of the content pack will be described with reference to FIGS. 5 and 6.

The touch panel 304 is constituted of the display unit 331 and a touch sensor 332 superimposed on the screen. The display unit 331 is constituted of a liquid crystal display (LCD), an organic electroluminescence display (OELD), or the like and displays various types of information under the control of the control unit 301.

Furthermore, the touch sensor 332 detects an input operation performed by the user with respect to the touch panel 304 and the position of the operation on the touch panel 304, and supplies a detection signal thereof to the control unit 301. The control unit 301 controls operations of the respective sections according to the detection signal from the touch sensor 332.

The operation unit 305 is a physical button or the like disposed in the browser apparatus 30 and supplies an operation signal to the control unit 301 according to a user's operation. The control unit 301 controls operations of the respective sections of the browser apparatus 30 according to the operation signal from the operation unit 305.

The cash memory 306 temporarily stores various types of data under the control of the control unit 301.

The recording medium 307 is constituted of, for example, a removable memory card or a hard disk drive (HDD). The recording medium 307 records various types of data under the control of the control unit 301.

A power supply unit 308 supplies a power-supply power obtained from a storage battery or an external power-supply to the respective sections of the browser apparatus 30 including the control unit 301.

In the thus configured browser apparatus 30, the web content multicast-distributed from the intermediate server apparatus 20 is received and displayed by the web browser 303. Therefore, it can be said that the browser apparatus 30 is a client apparatus in which the web browser 303 having the function adapted for multicast distribution of the web content is implemented.

Note that, in the browser apparatus 30, the control unit 301, the communication I/F 302, the touch panel 304, the operation unit 305, the cash memory 306, the recording medium 307, and the power supply unit 308 are configured as hardware. On the other hand, in the browser apparatus 30, the web browser 303 is realized by a program executed by a CPU (e.g., CPU 901 in FIG. 11).

<2. Protocol Stack>

(Configuration of Web Browser)

Figure 4:
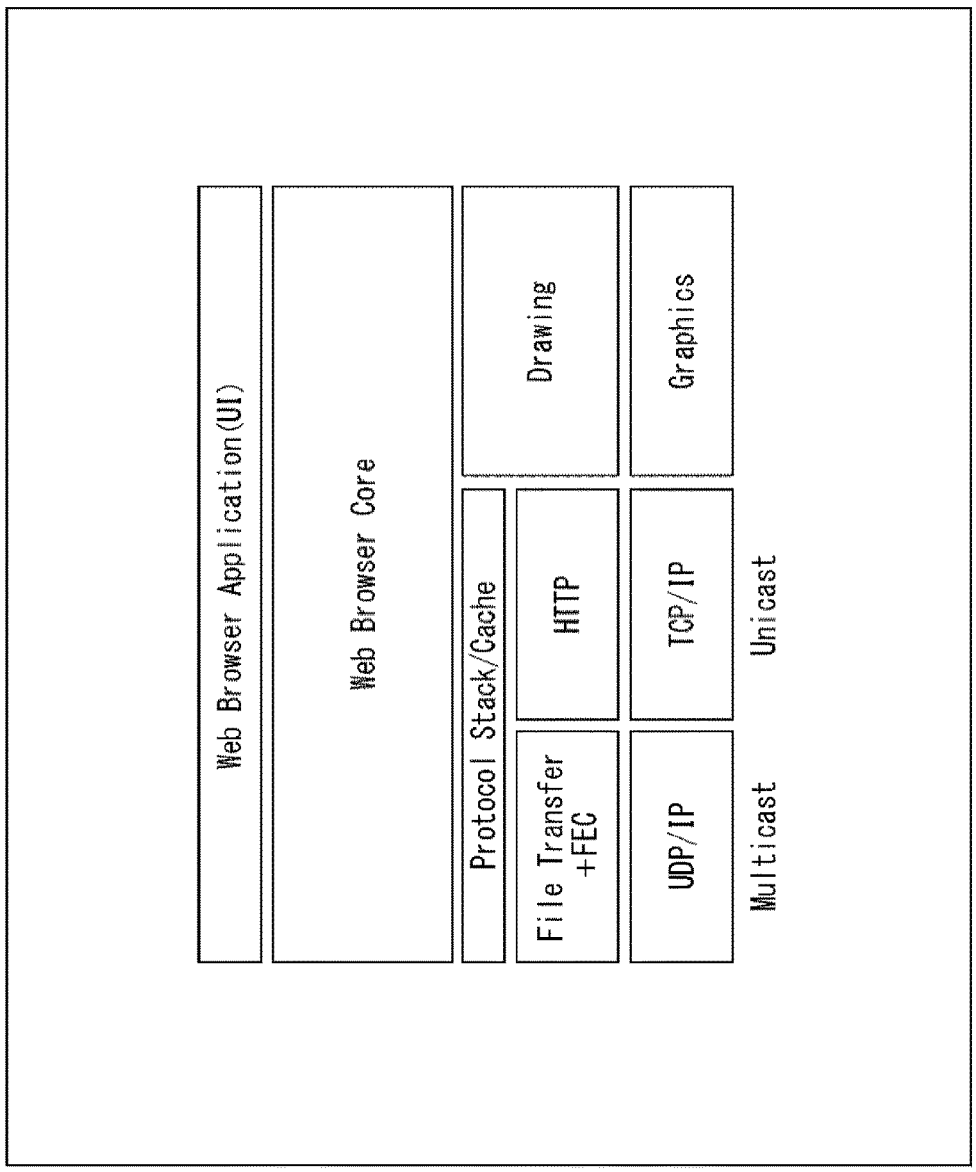
FIG. 4 A diagram showing a configuration of a web browser application adapted for multicast.

FIG. 4 is a diagram showing a configuration of the web browser 303 having the function adapted for multicast distribution of the web content.

In the configuration of the web browser 303 in FIG. 4, UDP/IP at the lowest hierarchy level and a file transfer protocol at a higher hierarchy level next to the UDP/IP are used for multicast communication. Regarding the user datagram protocol/internet protocol (UDP/IP), data is transmitted and received by connectionless type communication. Furthermore, the file transfer protocol is a protocol for transferring a file. Note that error correction can be performed by adding forward error correction (FEC) to data to be transferred.

Hereinafter, these protocols used for the multicast communication will be referred to "multicast protocols." In the intermediate server apparatus 20 of FIG. 2, communication according to this multicast protocol is performed by the multicast communication unit 222. Furthermore, in the browser apparatus 30 of FIG. 3, communication using the multicast protocol is performed by the multicast communication unit 322.

Furthermore, TCP/IP at the lowest hierarchy level and HTTP at a higher hierarchy level next to the TCP/IP are used for unicast communication. In the TCP/IP (transmission control protocol/internet protocol), data is transmitted and received by connection-type communication. The HTTP is a communication protocol used for transmission and reception of the web content between the client apparatus and the server apparatus.

Hereinafter, these protocols used for the unicast communication will be referred to as "unicast protocols." In the intermediate server apparatus 20 of FIG. 2, communication according to this unicast protocol is performed by the unicast communication unit 221. Furthermore, in the browser apparatus 30 of FIG. 3, communication using the unicast protocol is performed by a unicast communication unit 321.

A protocol stack/cache is commonly disposed at a hierarchy level higher than that of the multicast protocol and the unicast protocol. In the protocol stack/cache, error correction processing, resource-cashing processing, and the like are performed.

Graphics are images of parts that constitute a user interface (UI) of the web browser 303 and drawn on the screen of the display unit 331 of the touch panel 304 by the drawing unit 313 of FIG. 3 during activation of the web browser.

A web browser core analyzes the web content and computes the positions and the like of characters or images drawn on the screen of the display unit 331. The web browser core is also capable of interpreting CSS, JavaScript (registered trademark), or the like other than an HTML document. The web browser core displays information on news, a weather forecast, an advertisement, or the like in its display region together with the UI of the web browser 303 based on the analysis result of the web content (web browser application (UI)).

Note that the web browser core of FIG. 4 corresponds to the syntax analyzer 312 and the drawing unit 313 in the web browser 303 of FIG. 3.

As described above, in the configuration of the web browser 303 of FIG. 4, not only the HTTP using the unicast protocol but also a protocol for file reception using the multicast protocol are prepared. Therefore, it becomes possible to receive the entire web content using the unicast protocol or the multicast protocol or receive a part of a certain web content item using the unicast protocol, and the other part using the multicast protocol.

<3. Distribution Method for Web Content>

Next, referring to FIGS. 5 and 6, a distribution method for web content will be described.

The web content of news, a weather forecast, or the like is packaged and distributed as a content pack. As shown in FIG. 5, the content pack includes a body containing compressed data obtained by compressing files of an HTML document, CSS, JavaScript (registered trademark), image data, and the like together. Header information (header) and a check sum are added to the body.

The header information includes at least uniform resource locator (URL) address and update time of the web site. With this URL address, the web site can be identified. Furthermore, whether or not the web site has been updated can be checked by the update time. For example, a web site that provides news is updated to latest information as needed. Therefore, by checking this update time, whether or not it is already acquired information can be checked.

Furthermore, by the intermediate server apparatus 20 adding the check sum to the body of the content pack, the browser apparatus 30 is capable of performing error detection of the distributed content pack.

Figure 6:
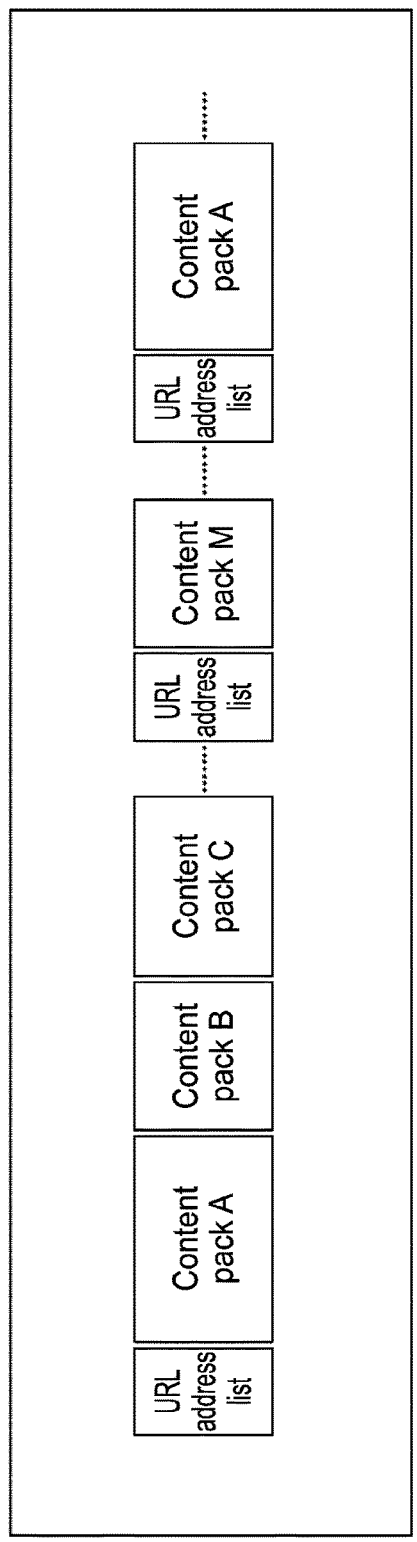
FIG. 6 A diagram showing a distribution method for web content.

As shown in FIG. 6, the content pack is generated for each of web content items of news, a weather forecast, and the like and those content packs are repeatedly distributed in predetermined units. Furthermore, with respect to the repeatedly distributed content packs, URL address lists including at least URL addresses of the web content items are inserted at predetermined intervals. Note that the URL address lists may include the update times such that whether or not the web sites have been updated can be checked based on the URL address lists.

FIG. 6 exemplifies a case where content packs A to Z are distributed. As shown in FIG. 6, after the URL address list is distributed, the content packs A, B, C, . . . , L are first distributed in the stated order. After the content pack L is distributed, the URL address list is distributed again and then the content packs M, . . . , Z are distributed.

Then, the sequence of the content packs has been distributed, and hence processing returns to the start and such distribution is repeated in the order of the URL address list, the content packs A, B, C, . . . .

Thus, the intermediate server apparatus 20 cannot predict when the browser apparatus 30 will start reception of content packs. Therefore, by repeatedly multicast-distributing the same content pack in predetermined units, the browser apparatus 30 is capable of reliably acquiring a desired content pack. Furthermore, by inserting the URL address lists into the content packs at predetermined intervals, the browser apparatus 30 is capable of recognizing the content pack being currently distributed.

Furthermore, the files of the HTML document, the image data, and the like that constitute the web content can be individually distributed. By packaging the files as the content pack, compressing the files together, and adding the URL address and the like of the web content as the header information, it is possible to reduce an amount of distribution data during, for example, multicast distribution and efficiently perform reception processing at the browser apparatus 30.

<4. Specific Processing Flows of Apparatuses>

(Web Content Distribution Processing)

First, referring to the flowchart of FIG. 7, web content distribution processing, which is executed by the intermediate server apparatus 20, will be described.

In Step S101, the unicast communication unit 221 acquires, under the control of web content acquisition control unit 211, the web content from the web server apparatuses 10-1 to 10-N. Note that the web content that is an acquisition target may be manually selected by a distributor or may be automatically identified if the web content as the acquisition target can be automatically identified.

In Step S102, the web content acquisition control unit 211 temporarily stores the web content acquired from the web server apparatuses 10-1 to 10-N, in the cash memory 202.

In Step S103, the content pack generation unit 212 packages the web content temporarily stored in the cash memory 202 and generates a content pack.

Figure 5:
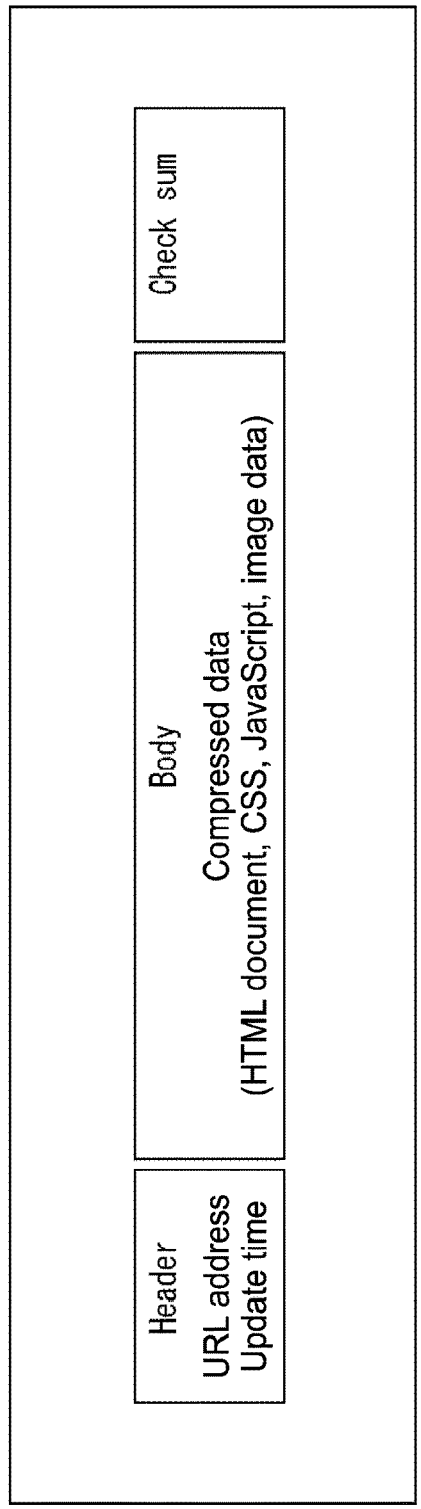
FIG. 5 A diagram showing an example of a structure of a content pack.

Here, compressed data obtained by compressing files of an HTML document and the like is disposed as the body of each content pack as shown in FIG. 5 described above and the URL address and update time of the web content are further added as the header information. Furthermore, a check sum for error detection is also added to each content pack.

In Step S104, the content pack generation unit 212 generates URL address lists based on the packaged web content. This URL address lists include the URL addresses of the web content items.

In Step S105, the multicast communication unit 222 multicast-distributes the content pack to the browser apparatuses 30-1 to 30-M that participate in the multicast group under the control of the web content distribution control unit 213.

Here, as described above, packets of the multicast-distributed content pack from the intermediate server apparatus 20 are relayed by the router apparatuses (not shown) on the network 90-2 and distributed to the browser apparatuses 30-1 to 30-M that participate in the multicast group.

Furthermore, in this multicast distribution, as shown in FIG. 6 described above, the plurality of content packs are repeatedly distributed in predetermined units and the URL address lists are inserted into the repeatedly distributed content packs at predetermined intervals.

Figure 7:
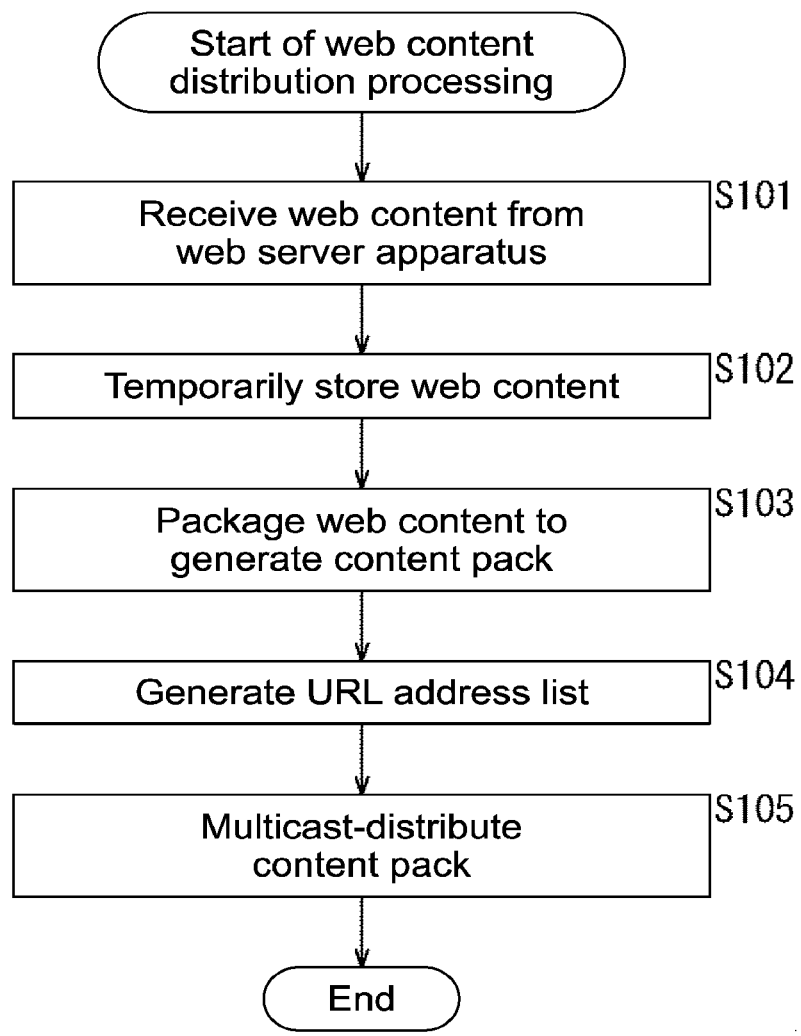
FIG. 7 A flowchart describing web content distribution processing.

When the processing of Step S105 is terminated, the web content distribution processing of FIG. 7 is terminated.

Hereinabove, the web content distribution processing has been described. In this web content distribution processing, the web content from the plurality of web server apparatuses 10 is collected by the intermediate server apparatus 20 and then multicast-distributed as the content packs by the plurality of browser apparatuses 30.

Therefore, even in the case of web content that many users view in approximately the same time zone, for example, news or a weather forecast, access concentration to the web server apparatus 10 does not occur. With this, loads on the network 90, the web server apparatus 10, and the like can be reduced. Therefore, it is possible to reduce a load in viewing web content and prevent occurrence of troubles.

Furthermore, the intermediate server apparatus 20 performs the unicast communication with the web server apparatus 10 and performs the multicast communication with the browser apparatus 30. Therefore, it can be said that the unicast communication is converted into the multicast communication. Then, even if the web server apparatuses 10 are not adapted for multicast distribution, the web content can be multicast-distributed to the browser apparatus 30 via the intermediate server apparatus 20.

(Web Content Reception Processing)

Next, referring to the flowchart of FIG. 8, web content reception processing, which is executed by the browser apparatus 30, will be described. Note that this web content reception processing is executed in the case where the intermediate server apparatus 20 executes the web content distribution processing of FIG. 7 and multicast-distributes the content packs. It should be noted that the browser apparatus 30 participates in the multicast group.

In Step S151, the multicast communication unit 322 receives, under the control of the control unit 301, a content pack multicast-distributed from the intermediate server apparatus 20.

In Step S152, the multicast communication unit 322 determines, under the control of the control unit 301, based on the header information of the received content pack, whether or not the URL address of the content pack is a specified URL address. For example, by specifying a URL address of a desired web site in advance, only web content (content pack) provided by the web site having the specified URL address is acquired.

If it is determined in Step S152 that the URL address of the content pack is different from the specified URL address, the processing returns to Step S151 and the above-mentioned processing is repeated. In this case, the content pack including the different URL address is discarded.

Note that, if the URL address lists inserted into the content packs at predetermined intervals can be acquired, by referring to this URL address lists, whether or not the content pack corresponding to the web site of the specified URL address is distributed can be determined.

Furthermore, if it is determined in Step S152 that the URL address of the content pack coincides with the specified URL address, the processing proceeds to Step S153. In Step S153, the content pack processing unit 314 determines, under the control of the control unit 301, whether or not the check sum added to the content pack is used and the content pack is normal.

If it is determined in Step S153 that the content pack is normal, the processing proceeds to Step S154. In Step S154, the content pack processing unit 314 freezes the content pack under the control of the control unit 301. With this, the files of the HTML document and the like that are compressed and stored in the body of the content pack are acquired.

On the other hand, if it is determined in Step S153 that the content pack is not normal, the processing proceeds to Step S155. In Step S155, the content pack processing unit 314 performs, under the control of the control unit 301, error correction processing. In this error correction processing, in order to obtain a normal content pack, processing of re-receiving a part of the content pack or the entire content pack is performed, for example. Note that details of the error correction processing will be described with reference to the flowchart of FIG. 9.

When the resource of the HTML document file and the like is normally obtained in Step S154 or S155, the processing proceeds to Step S156.

In Step S156, the content pack processing unit 314 temporarily stores, under the control of the control unit 301, the resource of the HTML document file and the like in the cash memory 306. With this, the web browser core (syntax analyzer 312, drawing unit 313) is notified about the completion of reception of the web content (S157). Furthermore, at this time, the content pack processing unit 314 is capable of recording, under the control of the control unit 301, the resource of the HTML document file and the like on the recording medium 307.

In Step S158, the syntax analyzer 312 analyzes, under the control of the control unit 301, the resource of the web content temporarily stored in the cash memory 306 and computes the positions and the like of characters or images drawn on the screen of the display unit 331 of the touch panel 304 together with the UI of the web browser 303.

In Step S159, the drawing unit 313 displays, under the control of the control unit 301, based on the analysis result of the syntax analyzer 312, information on the news, the weather forecast, the advertisement, and the like as the web content on the display unit 331 of the touch panel 304. When the processing in Step S159 is terminated, the web content reception processing of FIG. 8 is terminated.

Hereinbefore, the web content reception processing has been described. In this web content reception processing, a desired content pack is acquired from among the plurality of content packs multicast-distributed from the intermediate server apparatus 20 and the web content obtained from this content pack is displayed.

Therefore, even in the case of web content of news, a weather forecast, and the like that many users views in approximately the same time zone, a number of browser apparatuses 30 do not simultaneously access a particular web server apparatus 10 in the same time zone. With this, the loads on the network 90, the web server apparatus 10, and the like can be reduced. As a result, it is possible to reduce a load in viewing web content and prevent occurrence of troubles.

(Error Correction Processing)

Next, referring to the flowchart of FIG. 9, the error correction processing, which corresponds to the processing in Step S155 of FIG. 8, will be described.

In Step S201, the content pack processing unit 314 determines, under the control of the control unit 301, whether or not decompression excluding an error part (damaged part) of a content pack is possible. If it is determined in Step S201 that the decompression excluding the error part is possible, the processing proceeds to Step S202.

In Step S202, the content pack processing unit 314 decompresses, under the control of the control unit 301, the content pack, excluding the error part.

In Step S203, the content pack processing unit 314 determines, under the control of the control unit 301, a damaged resource among resources of the body of the content pack.

In Step S204, the unicast communication unit 321 sends, under the control of the control unit 301, based on the determination result of the resource in the processing in Step S203, a request of the damaged resource to the intermediate server apparatus 20.

In Step S205, the unicast communication unit 321 receives, under the control of the control unit 301, a part of the resource distributed from the intermediate server apparatus 20. Here, the part of the resource is a resource corresponding to the resource of the damaged part.

In Step S206, the content pack processing unit 314 replaces, under the control of the control unit 301, the damaged resource by the newly received resource. With this, for example, in the case where image data of the resource is damaged, only image data is acquired again, it is replaced by the new image data, and the resource of the damaged part becomes a normal resource. As a result, files of normal HTML document, CSS, JavaScript (registered trademark), image data, and the like are obtained.

On the other hand, if it is determined in Step S201 that the decompression excluding the error part is impossible, the processing proceeds to Step S207.

In Step S207, the unicast communication unit 321 sends, under the control of the control unit 301, a request of re-distribution of the content pack to the intermediate server apparatus 20.

In Step S208, the unicast communication unit 321 re-receives, under the control of the control unit 301, the corresponding content pack distributed from the intermediate server apparatus 20.

In Step S209, the content pack processing unit 314 determines, under the control of the control unit 301, whether or not the re-received content pack is normal, using a check sum added to the content pack.

If it is determined in Step S209 that the re-received content pack is not normal, the processing returns to Step S207 and the above-mentioned processing is repeated. That is, the processing in Steps S207 to S209 is repeated for re-reception of the content pack. If a normal content pack is received, the processing proceeds to Step S210.

In Step S210, the content pack processing unit 314 decompresses the content pack under the control of the control unit 301. With this, the files of the HTML document and the like compressed and stored in the body of the re-received content pack are acquired.

Figure 8:
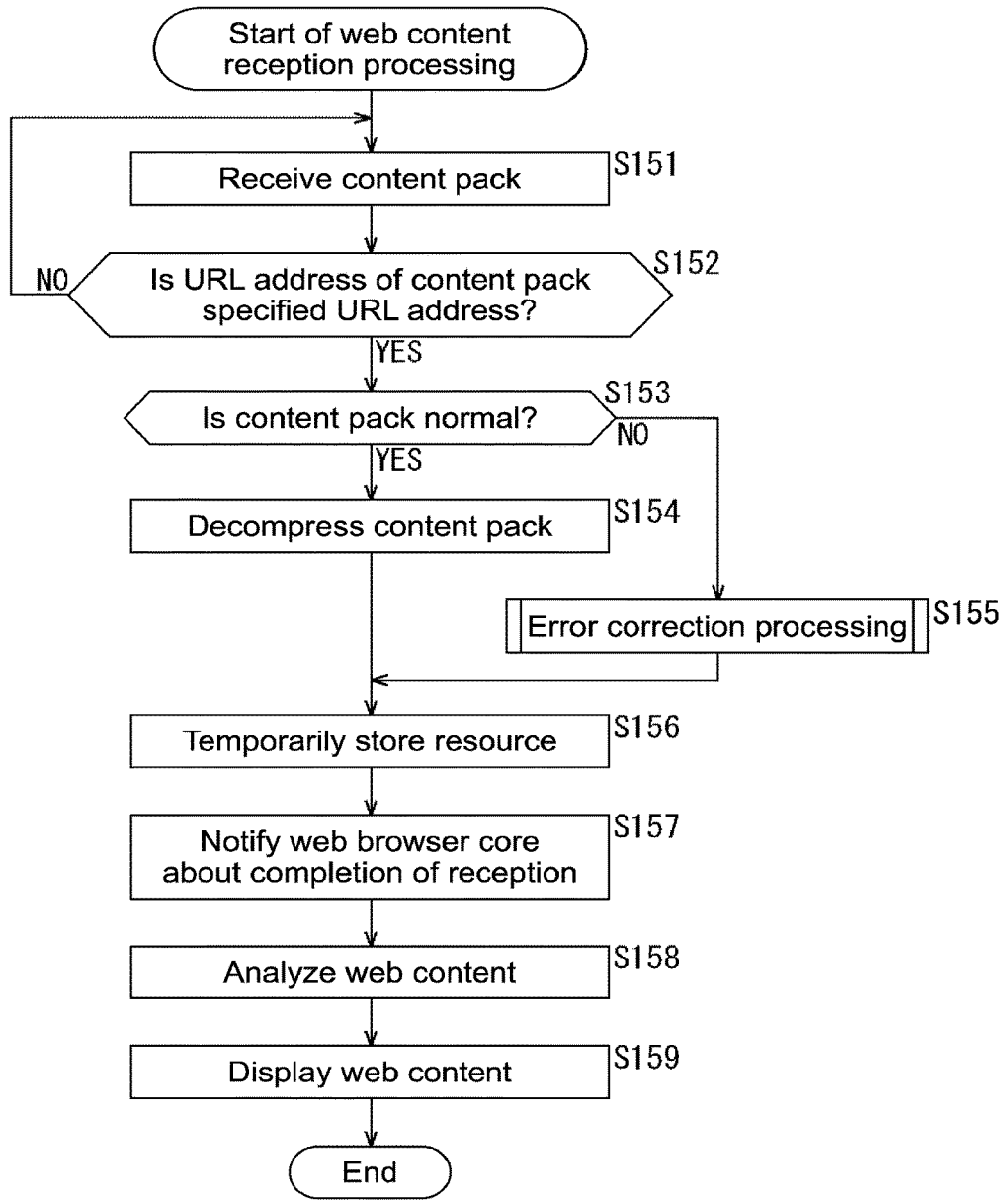
FIG. 8 A flowchart describing web content reception processing.
Figure 9:
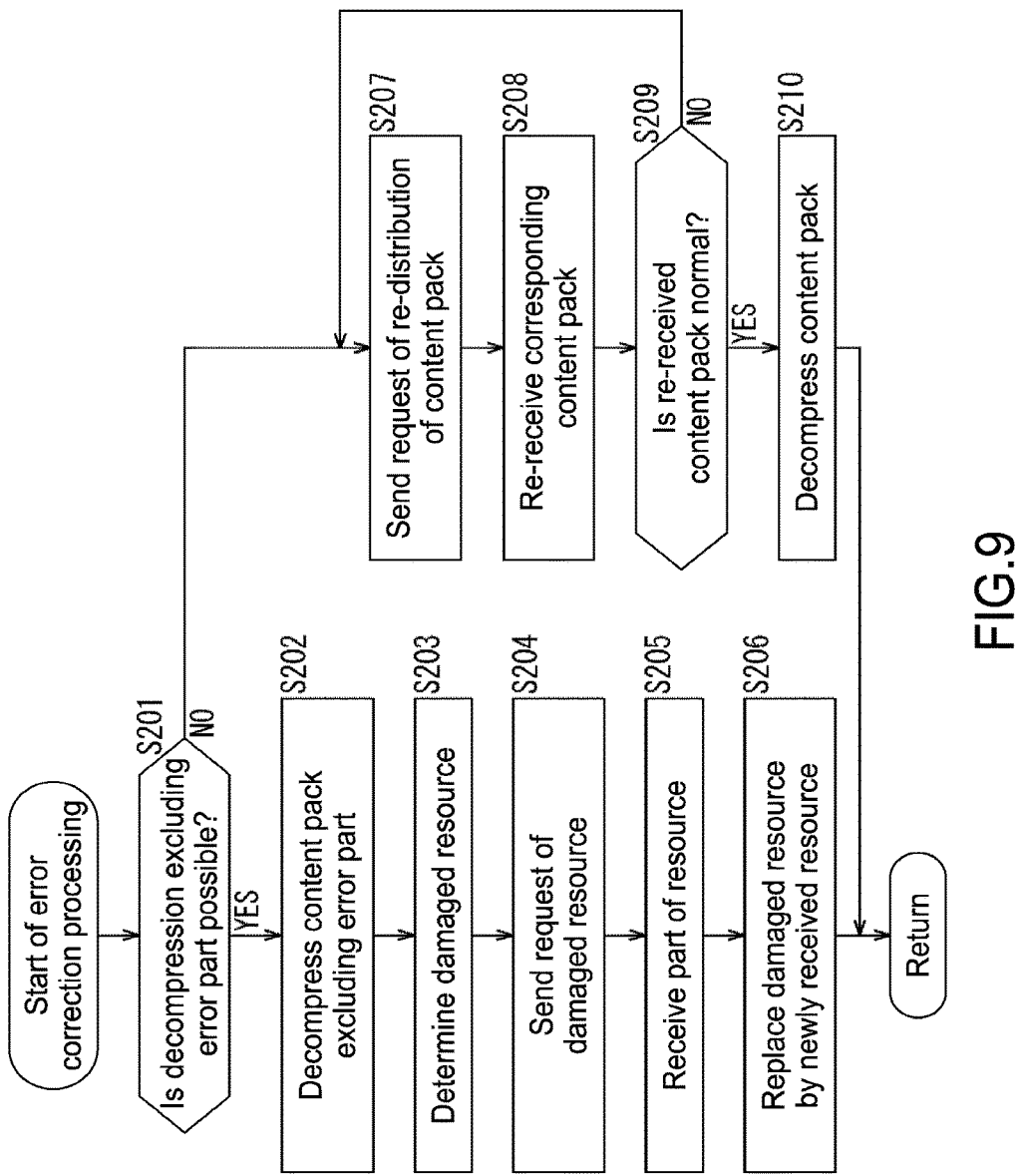
FIG. 9 A flowchart describing details of error correction processing.

When the processing in Step S206 or S210 is terminated, the error correction processing of FIG. 9 is terminated, the processing returns to the processing in Step S155 of FIG. 8, and the subsequent processing is executed.

Hereinabove, the error correction processing has been described. In this error correction processing, even in the case where the received content pack is damaged, all or some of the data items can be re-received and the normal content pack can be obtained. Thus, the browser apparatus 30 is capable of reliably displaying the web content.

If the decompression excluding the error part of the content pack is possible, only the damaged resource is acquired again. Therefore, in comparison with the case where all the resources are acquired, it is possible to reduce loads on the network 90 and the intermediate server apparatus 20. Note that, if the decompression excluding the error part of the content pack is possible, only a part excluding the damaged resource may be displayed. With this, for example, if image data is damaged, it becomes possible to ignore the image data and display only text information.

That is, the multicast protocol used for multicast distribution is based on the UDP, and hence there is a case where data is not normally delivered due to packet loss or the like. forward error correction (FEC) is used for the communication error and whether or not received data is erroneous is detected. If there is an error, correction thereof will be tried. With respect to an error that cannot be corrected by FEC, the browser apparatus 30 uses the unicast protocol to request the corresponding data from the intermediate server apparatus 20 and replaces it by the received data for correction. Furthermore, in the case where a content pack is repeatedly distributed from the intermediate server apparatus 20, the browser apparatus 30 may read in a subsequently re-distributed content pack and perform replacement for correction.

(Web Content Re-Distribution Processing)

Next, referring to the flowchart of FIG. 10, web content re-distribution processing, which is executed by the intermediate server apparatus 20, will be described. Note that the web content re-distribution processing is executed in the case where the browser apparatus 30 executes the error correction processing of FIG. 9 and requests re-distribution of the resource or content pack of the damaged part.

In Step S251, the control unit 201 controls the unicast communication unit 221 and determines whether or not a request of a part of a resource has been received from the browser apparatus 30. In Step S251, if it is determined that the request of the part of the resource has been received, the processing proceeds to Step S252.

In Step S252, the web content distribution control unit 213 acquires the corresponding part of the resource from the web content temporarily stored in the cash memory 202.

In Step S253, the unicast communication unit 221 distributes, under the control of the web content distribution control unit 213, the corresponding part of the resource to the browser apparatus 30 as a transmission source of the request.

On the other hand, if it is determined in Step S251 that the request of the part of the resource has not been received, the processing proceeds to Step S254.

In Step S254, the control unit 201 controls the unicast communication unit 221 and determines whether or not the request of re-distribution of the content pack has been received from the browser apparatus 30. If it is determined in Step S254 that the request of re-distribution of the content pack has been received, the processing proceeds to Step S255.

In Step S255, the web content distribution control unit 213 acquires the corresponding content pack. Here, for example, the content pack generated by the content pack generation unit 212 may be retained in the cash memory 202 or the like in the first distribution and it may be acquired. Alternatively, the content pack generation unit 212 may generate the content pack from the web content temporarily stored in the cash memory 202 again.

In Step S256, the unicast communication unit 221 re-distributes, under the control of the web content distribution control unit 213, the corresponding content pack to the browser apparatus 30 as the transmission source of the request.

Note that, if it is determined in Step S254 that the request of the re-distribution of the content pack has not been received, the processing in Steps S255 and S256 is skipped.

Figure 10:
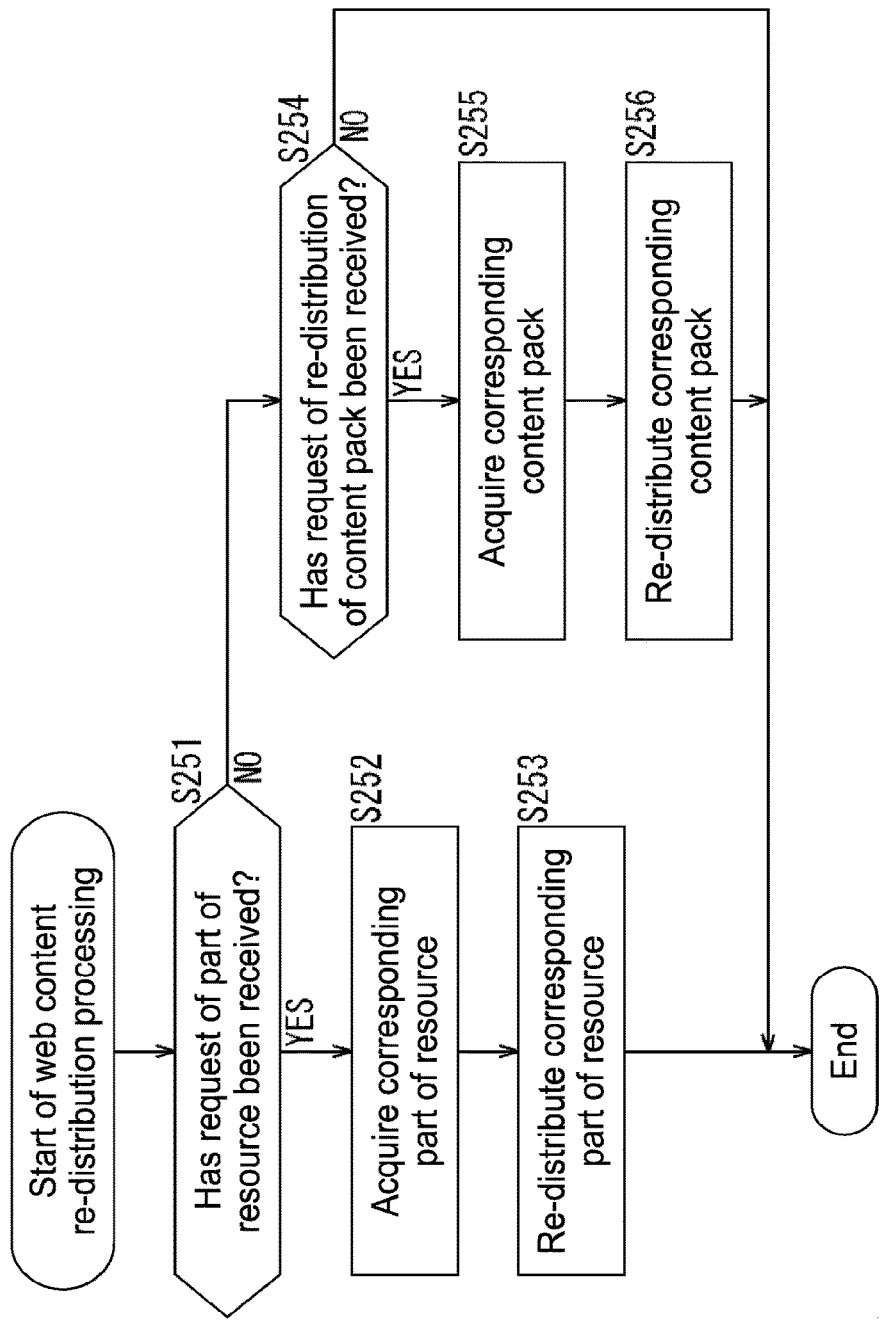
FIG. 10 A flowchart describing web content re-distribution processing.

When the processing in Step S253 or S256 is terminated, the web content re-distribution processing of FIG. 10 is terminated.

Hereinabove, the web content re-distribution processing has been described. In this web content re-distribution processing, even in the case where the content pack received by the browser apparatus 30 is damaged, the entire data or the part of the data can be re-distributed and the normal content pack can be provided, and hence the browser apparatus 30 is capable of reliably displaying the web content.

Furthermore, in the case where the decompression excluding the error part of the content pack is possible, only the damaged resource is re-distributed. Therefore, in comparison with the case where all the resources are distributed, the loads on the network 90 and the intermediate server apparatus 20 can be reduced.

As described above, in accordance with the present technology, in the case where many users simultaneously view the same web content of news, a weather forecast, an advertisement, or the like, the loads on the network 90, the web server apparatus 10, and the like can be largely reduced. Thus, it is possible to prevent occurrence of troubles. Furthermore, the load in viewing the web content can be largely reduced. Therefore, it is unnecessary to provide equipment assuming load peaks due to access from many browser apparatuses and it is possible to reduce the cost of the equipment.

<5. Modified Example>

Note that, in the above description, when the browser apparatus 30 receives the multicast-distributed content packs, the header information (URL addresses) is referred to and unnecessary content packs are discarded (skipped). Alternatively, all the received content packs may be stored in the recording medium 307 and then the unnecessary content packs may be deleted.

Furthermore, in the above description, the intermediate server apparatus 20 multicast-distributes the content pack obtained by packaging files of the HTML document, the image data, and the like that constitute the web content. However, the distribution method using this content pack is an example. For example, a distribution method of multicast-distributing, for example, files that constitute web content from the web server apparatus 10 as they are may be adopted. Furthermore, the example in which the same content pack is repeatedly distributed has been described above. Alternatively, depending on the type and the like of the web content, the web content may be distributed only one time or may be repeatedly distributed for a certain period.

In addition, if the browser apparatus 30 is capable of receiving a content pack corresponding to desired web content, the web server apparatus 10 on the network 90 may be directly accessed based on a specified URL address or desired web content may be acquired via the intermediate server apparatus 20.

Furthermore, in the above description, for the sake of description, the multicast group is managed by the router apparatuses (not shown) on the network 90. Alternatively, the intermediate server apparatus 20 and other server apparatuses may be managed.

<6. Configuration of Computer>

The above-mentioned series of processing may be executed by hardware or may be executed by software. In the case where the above-mentioned series of processing is executed by software, a program that configures the software is installed into a computer. Here, the computer includes a computer that incorporates dedicated hardware, a personal computer that installs various programs, for example, a general-purpose personal computer capable of executing various functions, and the like.

Figure 11:
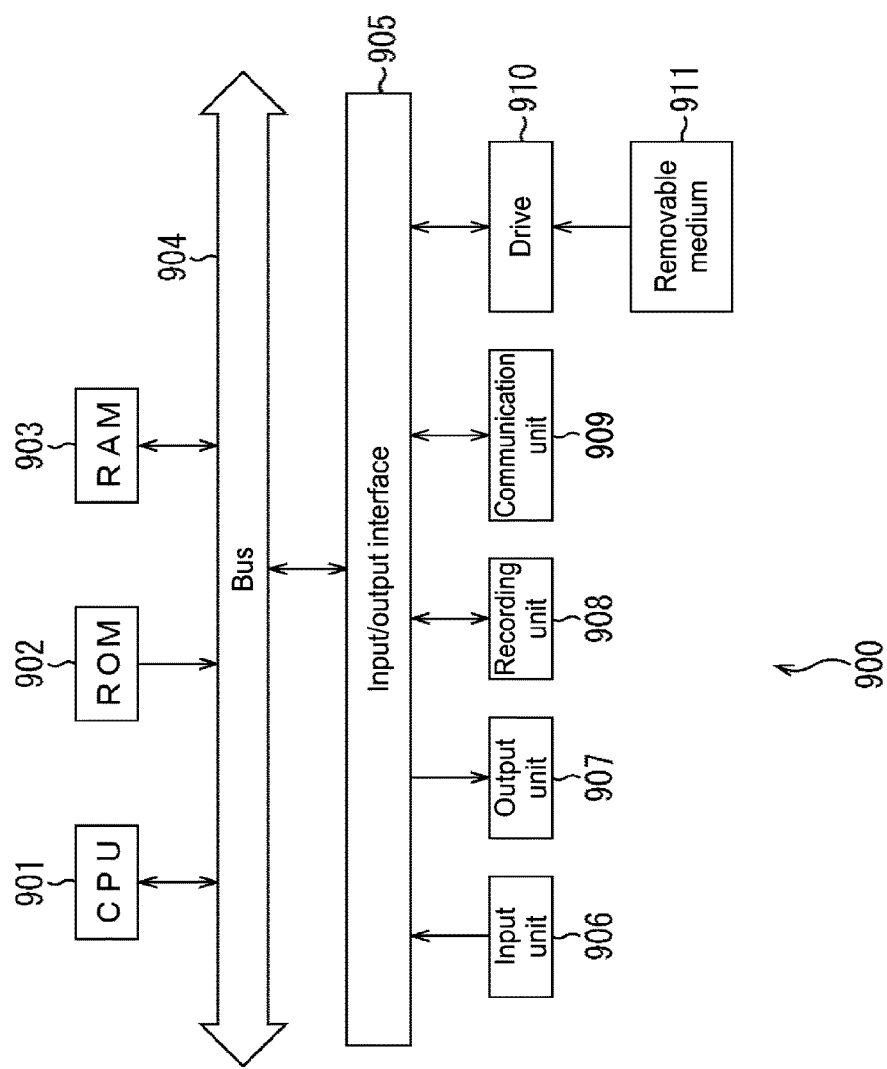
FIG. 11 A diagram showing a configuration example of a computer.

FIG. 11 is a block diagram showing a configuration example of hardware of a computer that executes the above-mentioned series of processing according to a program.

In a computer 900, a central processing unit (CPU) 901, a read only memory (ROM) 902, and a random access memory (RAM) 903 are mutually connected via a bus 904. To the bus 904, further connected is an input/output interface 905. To the input/output interface 905, connected are an input unit 906, an output unit 907, a recording unit 908, a communication unit 909, and a drive 910.

The input unit 906 is a keyboard, a mouse, or a microphone, for example. The output unit 907 is a display or a speaker, for example. The recording unit 908 is a hard disk or a non-volatile memory, for example. The communication unit 909 is a network interface, for example. The drive 910 drives a removable medium 911 such as a magnetic disk, an optical disc, a magneto-optical disk, and a semiconductor memory.

In the thus configured computer 900, by the CPU 901 loading, for example, the program stored in the recording unit 908 into the RAM 903 via the input/output interface 905 and the bus 904, the above-mentioned series of processing is performed.

The program that executes the computer 900 (CPU 901) can be recorded on the removable medium 911 as a package medium, for example, and provided. Furthermore, the program can be provided in a wired or wireless transmission medium such as a local area network, the Internet, and digital satellite broadcasting.

In the computer 900, the program can be installed into the recording unit 908 via the input/output interface 905 by the removable medium 911 being mounted on the drive 910. Furthermore, the program can be received by the communication unit 909 and installed into the recording unit 908 via a wired or wireless transmission medium. In addition to this, the program can be installed into the ROM 902 or the recording unit 908 in advance.

Note that the program executed by the computer 900 may be a program in which the processes are performed in time series in the order described in the present specification or may be a program in which the processes are performed in parallel or at a necessary timing, when called, for example.

Here, in the present specification, a processing step of describing a program that causes the computer 900 to execute various types of processing does not necessarily need to be processed in time series in the order described as the flowchart and also includes processes executed in parallel or individually (e.g., parallel processing or object processing).

The program may be processed by a single computer or may be distributed and processed by a plurality of computers. In addition, the program may be transferred to a remote computer and executed.

In addition, in the present specification, the system means a set of a plurality of components (apparatuses, modules (parts), etc.) and all the components do not need to be in the same casing. Thus, a plurality of apparatuses housed in separate casings and connected via the network and a single apparatus including a plurality of modules in a single casing are both systems.

Note that embodiments of the present technology are not limited to the above-mentioned embodiments and various modifications can be made without departing from the gist of the present technology. For example, the present technology can take a configuration of cloud computing in which a single function is shared by a plurality of apparatuses via a network and commonly processed.

The steps described above with reference to the flowcharts may be executed by a single apparatus or may be shared and executed by a plurality of apparatuses. In addition, in the case where a single step includes a plurality of processes, the plurality of processes of the step may be executed by a single apparatus or may be shared and executed by a plurality of apparatuses.

Note that the present technology can also take the following configurations.

(1)

A browser apparatus that implements a web browser application including a first communication function section that sends a request to a web site and receives web content from the web site using a unicast protocol, and a second communication function section that receives web content multicast-distributed using a multicast protocol, including a control unit that controls, in response to an external input, the first communication function section of the web browser application to send a request to a web site and receive web content from the web site using the unicast protocol.

(2)

The browser apparatus according to (1), in which the second communication function section receives a plurality of web content items, and the control unit records only a web content item of the plurality of web content items, which has a particular URL address, on a recording medium.

(3)

The browser apparatus according to (1) or (2), in which the control unit controls, if the web content received by the second communication function section has an error, the first communication function section to request the web content from the web site.

(4)

The browser apparatus according to any one of (1) to (3), further including a communication interface capable of accessing a mobile communication network, in which the first communication function section and the second communication function section performs communication via the communication interface.

(5)

A recording medium that records a program that causes a computer, which implements a web browser application having a first communication function that sends a request to a web site and receives web content from the web site using a unicast protocol, and a second communication function that receives web content multicast-distributed using a multicast protocol, to realize a function of controlling, in response to an external input, the first communication function of the web browser application to send a request to a web site and receive web content from the web site using a unicast protocol.

(6)

A server apparatus, including:

a first communication function section that receives web content from a web site using a unicast protocol;

a cash memory that temporarily stores the web content;

a second communication function section that multicast-distributes the temporarily stored web content using a multicast protocol; and a control unit that controls operations of the first communication function section, the second communication function section, and the cash memory.

(7)

The server apparatus according to (6), in which the control unit adds header information including at least an update time of the web content to the temporarily stored web content and packages the web content, to thereby generate a content pack, and the second communication function section multicast-distributes the content pack.

(8)

The server apparatus according to (7), in which the control unit further adds a check sum for error correction to the web content and packages the web content.

(9)

The server apparatus according to (7) or (8), in which the control unit generates a list of URL addresses of web sites of a plurality of content packs, and the second communication function section multicast-distributes the list of the URL addresses at predetermined intervals.

(10)

An information processing method for a server apparatus, including the steps of: by the server apparatus controlling reception of web content from a web site using a unicast protocol;

controlling temporary storage of the web content in a cash memory; and controlling multicast distribution of the web content temporarily stored in the cash memory using a multicast protocol.

DESCRIPTION OF SYMBOLS 1 communication system
10, 10-1 to 10-N web server apparatus
20 intermediate server apparatus
30, 30-1 to 30-M browser apparatus
90, 90-1, 90-2 network
201 control unit
202 cash memory
203 communication unit
211 web content acquisition control unit
212 content pack generation unit
213 web content distribution control unit
221 unicast communication unit
222 multicast communication unit
301 control unit
302 communication I/F
303 web browser
311 communication unit
312 syntax analyzer
313 drawing unit
314 content pack processing unit
321 unicast communication unit
322 multicast communication unit
331 display unit
900 computer
901 CPU

The invention claimed is:

1. A browser apparatus comprising:
circuitry configured to
implement a web browser application including a first communication function section that sends a request to a web site and receives web content from the web site using a unicast protocol, and a second communication function section that receives web content multicast-distributed using a multicast protocol,
control, in response to an external input, the first communication function section of the web browser application to send a request to a web site and receive web content from the web site using the unicast protocol, wherein
the second communication function section receives a plurality of web content items,
the circuitry is configured to record only a web content item of the plurality of web content items, which has a particular URL address, on a recording medium, and
the circuitry is configured to control, when the web content received by the second communication function section has an error, the first communication function section to request the web content from the web site.

2. The browser apparatus according to claim 1, further comprising
a communication interface configured to access a mobile communication network, wherein
the first communication function section and the second communication function section perform communication via the communication interface.

3. A non-transitory computer-readable storage medium including computer executable instructions, wherein the instructions, when executed by a computer, cause the computer to perform a process, the process comprising:
sending, via a first communication function, a request to a web site and receiving web content from the web site using a unicast protocol;
receiving, via a second communication function, web content multicast-distributed using a multicast protocol;
controlling, in response to an external input, the first communication function of the web browser application to send a request to a web site and receive web content from the web site using a unicast protocol;
receiving, via the second communication function section, a plurality of web content items;
recording only a web content item of the plurality of web content items, which has a particular URL address, on a recording medium; and
controlling, when the web content received by the second communication function has an error, the first communication function to request the web content from the web site.

4. A server apparatus, comprising:
circuitry configured to receive web content from a web site using a unicast protocol; and
a cash memory that temporarily stores the web content, wherein
the circuitry is configured to multicast-distribute the temporarily stored web content using a multicast protocol,
the circuitry is further configured to
add header information including at least an update time of the web content to the temporarily stored web content, add a check sum for error correction to the web content, and package the web content, to thereby generate a content pack,
generate a list of URL addresses of web sites of a plurality of content packs, and multicast-distribute the list of the URL addresses at predetermined intervals.

5. An information processing method for a server apparatus, the information processing method comprising:

controlling reception of web content from a web site using a unicast protocol;

controlling temporary storage of the web content in a cash memory;

controlling addition of header information including at least an update time of the web content to the temporarily stored web content, addition of a check sum for error correction to the web content, and packaging of the web content, to thereby generate a content pack;

controlling generation of a list of URL addresses of web sites of a plurality of content packs;

controlling multicast distribution of the temporarily stored web content that is temporarily stored in the cash memory using a multicast protocol; and controlling multicast-distribution of the list of the URL addresses at predetermined intervals.

* * * * *